United States Patent
Hosokawa

(10) Patent No.: US 7,292,364 B2
(45) Date of Patent: Nov. 6, 2007

(54) PRINTING APPARATUS AND PRINT CONTROL METHOD

(75) Inventor: Naohiro Hosokawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 10/338,873

(22) Filed: Jan. 9, 2003

(65) Prior Publication Data

US 2003/0133155 A1    Jul. 17, 2003

(30) Foreign Application Priority Data

Jan. 16, 2002  (JP)  ............................. 2002-007980

(51) Int. Cl.
*G06F 15/00*  (2006.01)

(52) U.S. Cl. .................... 358/1.16; 358/502; 358/1.15; 358/1.4; 347/16; 347/37; 347/19; 347/17; 395/114; 709/213

(58) Field of Classification Search ............... 358/1.15, 358/1.16, 502, 1.4; 709/213; 347/37, 41, 347/14, 16, 17, 19; 400/615.2; 395/114
See application file for complete search history.

(56) References Cited

U.S. PATENT DOCUMENTS

| | | | | |
|---|---|---|---|---|
| 4,313,124 A | 1/1982 | Hara | .......................... | 346/140 |
| 4,345,262 A | 8/1982 | Shirato et al. | .............. | 346/140 |
| 4,459,600 A | 7/1984 | Sato et al. | .................. | 346/140 |
| 4,463,359 A | 7/1984 | Ayata et al. | ................. | 346/1.1 |
| 4,558,333 A | 12/1985 | Sugitani et al. | ............. | 346/140 |
| 4,723,129 A | 2/1988 | Endo et al. | .................. | 346/1.1 |
| 4,740,796 A | 4/1988 | Endo et al. | .................. | 346/1.1 |
| 5,537,552 A | 7/1996 | Ogasawara et al. | ......... | 395/250 |
| 5,894,545 A | 4/1999 | Fukuta | ....................... | 395/115 |
| 5,930,464 A * | 7/1999 | Nakayama et al. | ........ | 358/1.15 |
| 5,947,619 A * | 9/1999 | Kurashina et al. | ....... | 400/615.2 |
| 5,997,124 A * | 12/1999 | Capps et al. | .................. | 347/14 |
| 6,108,746 A | 8/2000 | Fujita et al. | .................. | 711/5 |
| 6,150,679 A | 11/2000 | Reynolds | ..................... | 257/213 |
| 6,173,338 B1 | 1/2001 | Fukuta | .......................... | 710/5 |
| 6,491,373 B1 * | 12/2002 | Fujita et al. | .................. | 347/41 |
| 6,731,400 B1 * | 5/2004 | Nakamura et al. | ........... | 358/1.9 |
| 2001/0005211 A1 * | 6/2001 | Minowa | ....................... | 347/37 |
| 2001/0013949 A1 * | 8/2001 | Tateyama | .................. | 358/1.16 |
| 2002/0194291 A1 * | 12/2002 | Najam et al. | ................ | 709/213 |
| 2003/0107767 A1 * | 6/2003 | Ishizaki | ...................... | 358/1.18 |

FOREIGN PATENT DOCUMENTS

| | | |
|---|---|---|
| JP | 10-326342 | 8/1998 |
| JP | 10-230642 | 9/1998 |
| JP | 2001-157049 | 6/2001 |

* cited by examiner

*Primary Examiner*—Aung S. Moe
*Assistant Examiner*—Ashish K. Thomas
(74) *Attorney, Agent, or Firm*—Fitzpatrick, Cella, Harper & Scinto

(57) ABSTRACT

When print data is stored as index data, a dedicated FIFO memory is interposed between a data processing circuit before index expansion, and an index expansion circuit, and temporarily stores the index data. The stored index data is read out by specifying a portion required for the process of a printhead, thus improving the memory access efficiency and throughput.

6 Claims, 14 Drawing Sheets

PRINTING APPARATUS AND PRINT CONTROL METHOD

FIELD OF THE INVENTION

The present invention relates to a printing apparatus and its control method and, more particularly, to print control in a color ink-jet printer which has high resolution and a large number of nozzles.

BACKGROUND OF THE INVENTION

In a conventional print data process, when given index data is read onto a print buffer, all data are expanded to indices and are written in the print buffer. The expanded data are read out to execute a print process.

However, in the conventional process, when the number of nozzles which form a printhead increases, access to a memory cannot be made in time, and a huge processing circuit is required to store a huge volume of data in a register.

SUMMARY OF THE INVENTION

It is an object of the present invention to achieve high-speed memory access, and to improve the throughput of the print process. In order to solve the aforementioned problem and to solve the above object, a printing apparatus and print control method according to the present invention comprise the following arrangements.

A printing apparatus which stores data sent from an external device in a memory, reads out the stored data, converts the readout data as print data in correspondence with a configuration of a printhead, and executes a print process by scanning a carriage that carries the printhead on a print medium on the basis of the converted data, comprises:

determination means for determining a priority order of data write or read access on the basis of a write request used to write data in the memory in a FIFO format, and a read request used to read out the stored data by designating the data using an address pointer; and memory control means for controlling the data read or write access to the memory on the basis of determination of the determination means, wherein the determination means updates a pointer that specifies a read address of the data in correspondence with the read request, and the memory control means controls to divisionalLy read out the data stored in the memory in the FIFO format in accordance with a memory address specified by the pointer.

A print control method which stores data sent from an external device in a memory, reads out the stored data, and converts the readout data as print data in correspondence with a configuration of a printhead, so as to print the data, comprises:

the determination step of determining a priority order of data write or read access on the basis of a write request used to write data in the memory in a FIFO format, and a read request used to read out the stored data by designating the data using an address pointer; and the memory control step of controlling the data read or write access to the memory on the basis of determination in the determination step, wherein the determination step includes the step of updating a pointer that specifies a read address of the data in correspondence with the read request, and the memory control step includes the step of controlling to divisionally read out the data stored in the memory in the FIFO format in accordance with a memory address specified by the pointer.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Note that embodiments to be described hereinafter will exemplify a printer as a printing apparatus that adopts an ink-jet print method.

In this specification, "printing" (which may also be referred to as "print") means not only processes for forming significant information such as characters, figures, and the like, but also processes for forming images, patterns, and the like on print media or processing such media irrespective of whether they are significant or insignificant, and whether they are elicited to be visually perceivable by human beings.

Also, "print media" mean not only paper sheets used in normal printing apparatuses, but also media that can receive ink, such as cloth, plastic films, metal plates, glass, ceramics, wood, skin, and the like.

Furthermore, "ink" (which may also be referred to as "liquid") should be broadly interpreted as in definition of "printing (print)", and means a liquid which can undergo formation of images, patterns, and the like, processing of print media, or ink processes (that solidify or make insoluble a color agent in ink to be applied to a print medium) when it is applied onto print media.

In the following description, though the embodiments which expand coded data, such as index data, are explained, the contents of the embodiments are not restricted to the expansion processing, but can be applied to the conversion without the increase in data based on the expansion. In the following description, the "conversion" is used as the language including the concept of "expansion".

<Outline of Apparatus Main Body>

Figure 12:
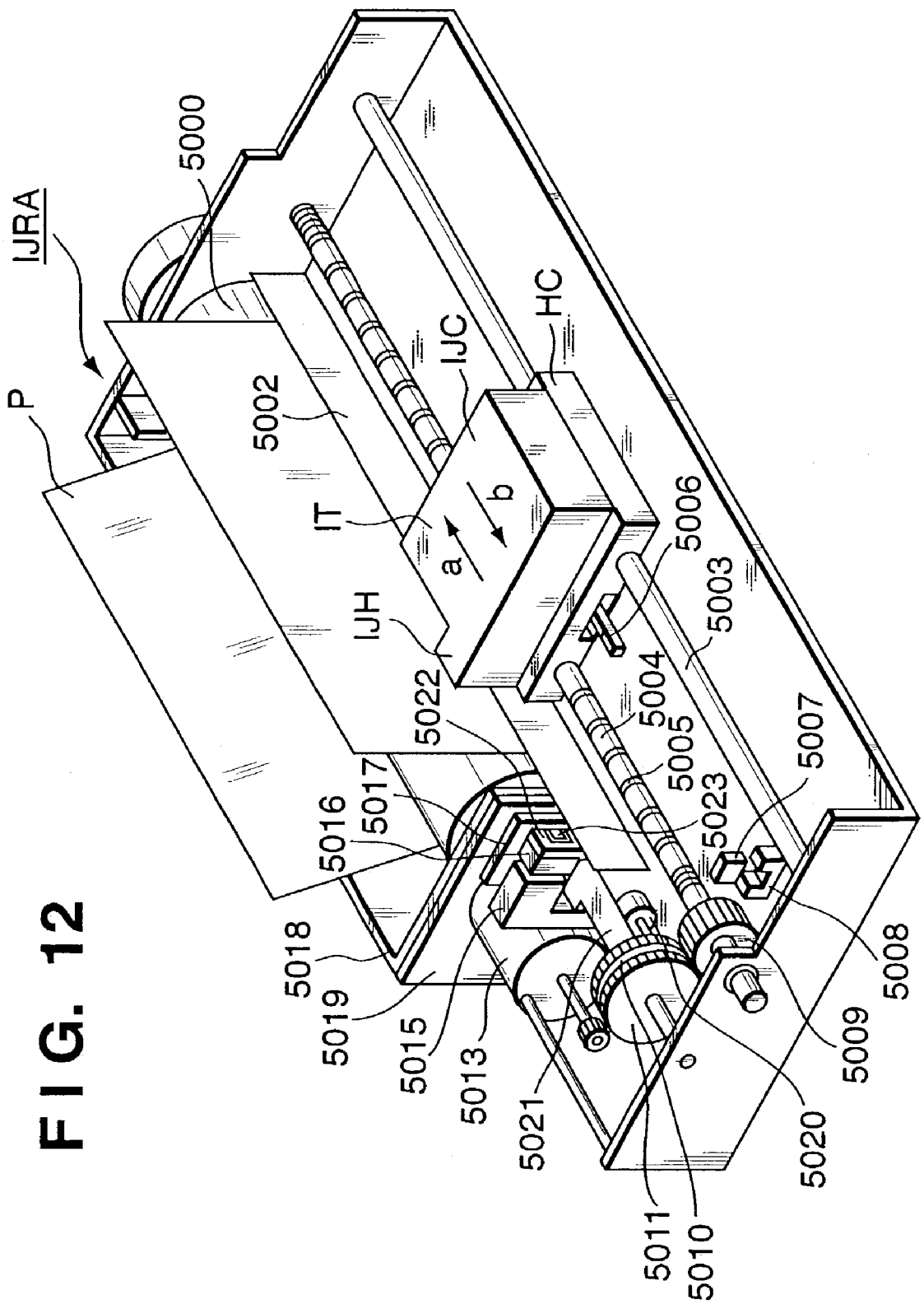
FIG. 12 is a perspective view showing the outer appearance of a printer as a preferred embodiment to which the present invention is applied.

FIG. 12 is a perspective view showing the outer appearance of an outline of the arrangement of an ink-jet printer IJRA as a typical embodiment of the present invention. Referring to FIG. 12, a carriage HC engages with a spiral groove 5004 of a lead screw 5005, which rotates via driving force transmission gears 5009 to 5011 in cooperation with the forward/reverse rotation of a driving motor 5013, and has a pin (not shown). The carriage HC is supported by a guide rail 5003 to be reciprocally movable in the directions of arrows a and b. An integrated type ink-jet cartridge IJC that incorporates a printhead IJH and an ink tank IT is carried on the carriage HC.

Reference numeral 5002 denotes a paper pressing plate which presses a print paper sheet P against a platen 5000 along the moving direction of the carriage HC. Reference numerals 5007 and 5008 denote photocouplers which serve as a home position detector for confirming the presence of a lever 5006 of the carriage HC in the corresponding region, and performing, e.g., the switching operation of the rotation direction of the motor 5013.

Reference numeral 5016 denotes a member for supporting a cap member 5022 that caps the front surface of the printhead IJH to attain suction recovery of the printhead IJH via an intra-cap opening 5023. Reference numeral 5017 denotes a cleaning blade; and 5019, a member which allows the blade 5017 to be movable in the back-and-forth direction. These members are supported by a main body support plate 5018. The blade 5017 is not limited to this specific one, but a known cleaning blade can be applied to this embodiment, needless to say.

Reference numeral 5021 denotes a lever for initiating suction. The lever 5021 moves upon movement of a cam 5020 which engages with the carriage, and its movement is controlled by a known transmission mechanism such as clutch switching by the driving force from a driving motor.

These capping, cleaning, and suction recovery are performed at their corresponding positions upon operation of the lead screw 5005 when the carriage HC arrives the region on the home position side. However, the present invention is not limited to a specific arrangement, as long as desired operations are performed at known timings.

<Control Arrangement>

The control arrangement for executing the print control of the aforementioned apparatus will be explained below.

Figure 13:
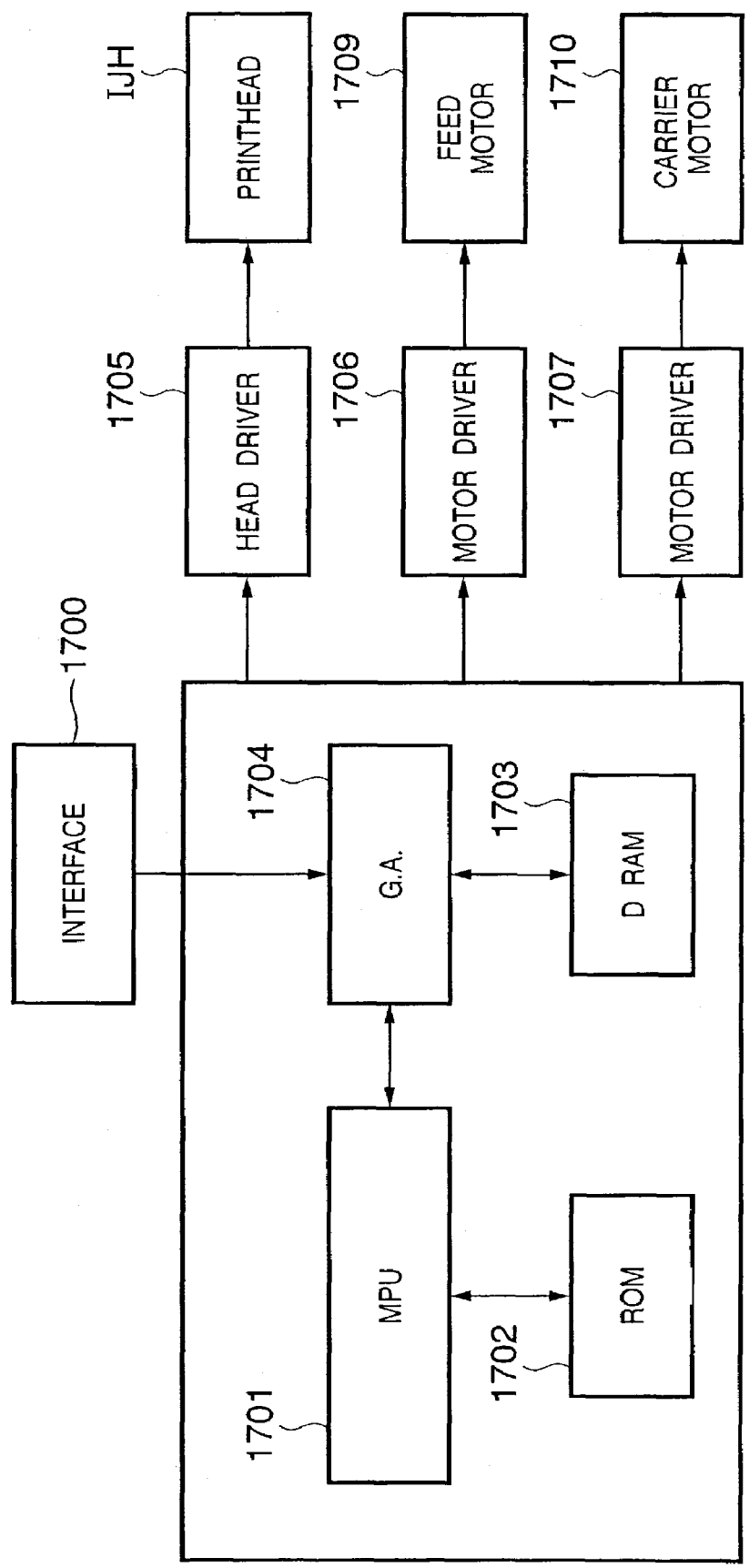
FIG. 13 is a block diagram showing the control arrangement of the printer shown in FIG. 12.

FIG. 13 is a block diagram showing the arrangement of a control circuit of the ink-jet printer IJRA. In FIG. 13 that shows the control circuit, reference numeral 1700 denotes an interface for inputting a print signal; 1701, an MPU; 1702, a ROM that stores a control program to be executed by the MPU 1701; and 1703, a DRAM that saves various data (the print signal, print data to be supplied to the head, and the like). Reference numeral 1704 denotes a gate array (G.A.) that controls supply of print data to the printhead IJH, and also controls data transfer among the interface 1700, MPU 1701, and RAM 1703. Reference numeral 1710 denotes a carrier motor used to convey the printhead IJH; and 1709, a feed motor used to feed a print sheet. Reference numeral 1705 denotes a head driver for driving the print head; and 1706 and 1707, motor drivers for respectively driving the feed motor 1709 and carrier motor 1710.

The operation of the control arrangement will be explained below. When a print signal is input to the interface 1700, the print signal is converted into print data for print between the gate array 1704 and MPU 1701. The motor drivers 1706 and 1707 are driven, and the printhead is driven in accordance with print data sent to the head driver 1705, thus printing data.

Note that the control program to be executed by the MPU 1701 is stored in the ROM 1702. Also, a storage medium that allows to erase/write data such as an EEPROM or the like may be added, so as to allow a host computer connected to the ink-jet printer IJRA to change the control program.

Note that the ink tank IT and printhead IJH may be integrally formed to constitute an exchangeable ink cartridge IJC. Alternatively, these ink tank IT and printhead IJH may be independently formed, and the ink tank IT alone may be exchanged when ink is used up.

Figure 14:
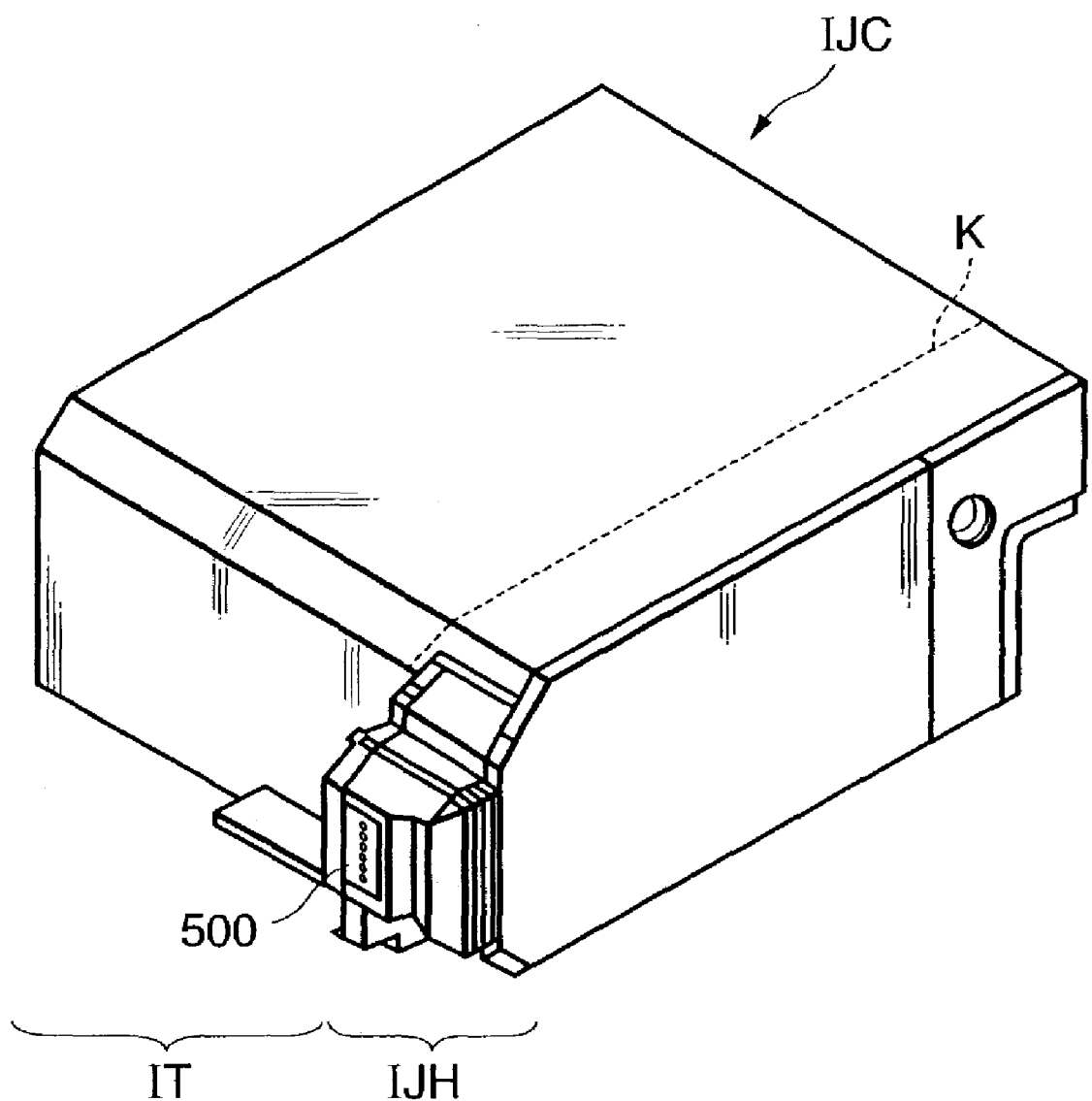
FIG. 14 is a perspective view showing an ink-jet cartridge of the printer.

FIG. 14 is a perspective view showing the outer appearance of the arrangement of the ink cartridge IJC from which the ink tank and head can be separated. From the ink cartridge IJC, the ink tank IT and printhead IJH can be separated at the position of a boundary line K, as shown in FIG. 14. The ink cartridge IJC has an electrode (not shown) for receiving an electrical signal supplied from the carriage HC side when it is mounted on the carriage HC. As described above, the printhead IJH is driven by this electrical signal to eject ink.

Note that reference numeral 500 in FIG. 14 denotes an ink ejection orifice array. The ink tank IT has a fibrous or porous ink absorbing member used to hold ink.

First Embodiment

Figure 1:
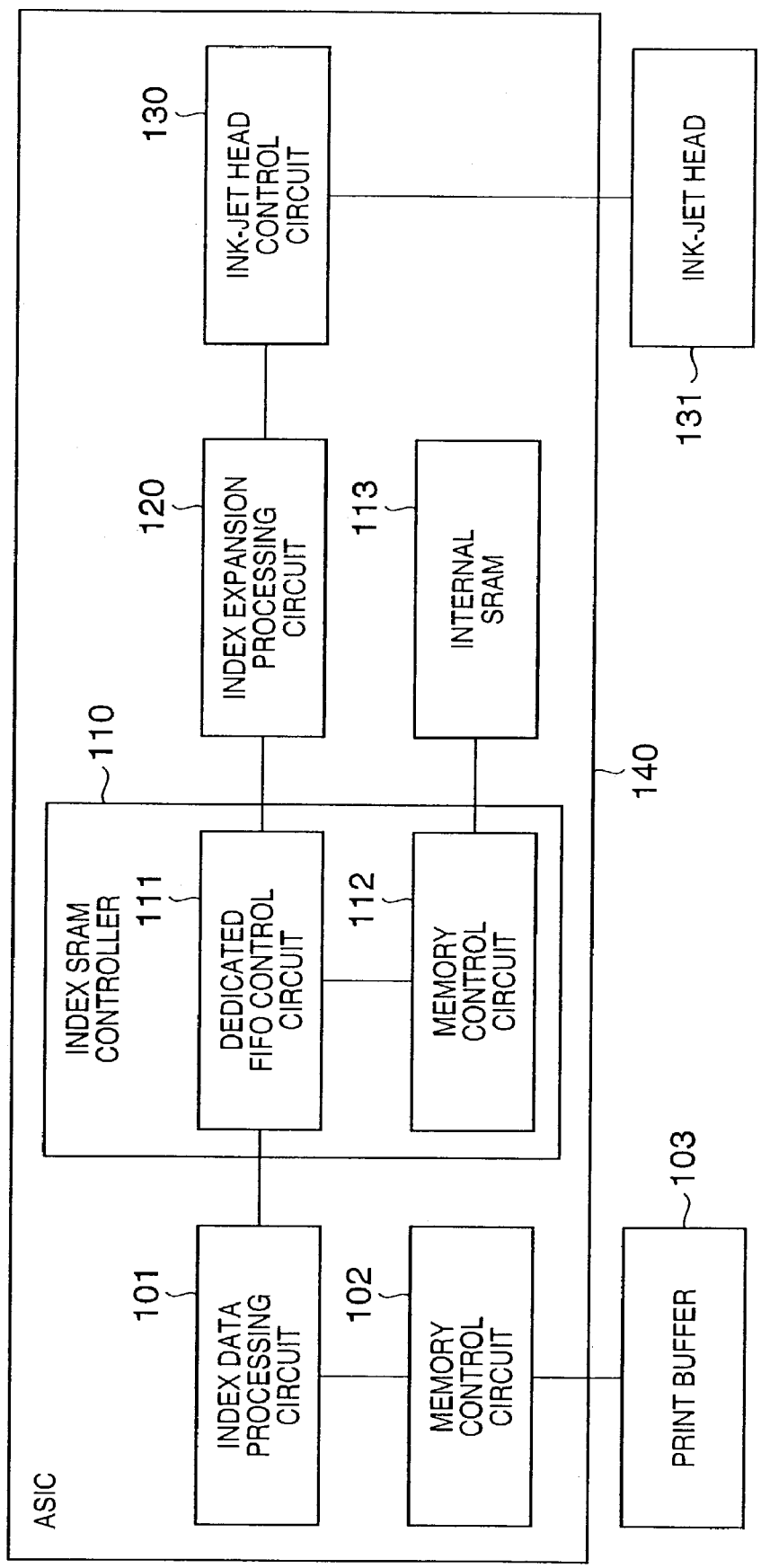
FIG. 1 is a block diagram showing the circuit arrangement of a printing apparatus according to the first embodiment.

FIG. 1 is a block diagram showing the circuit arrangement of a printing apparatus according to this embodiment. Referring to FIG. 1, reference numeral 103 denotes a print buffer that stores print data in a format of index data (which are coded as data that can be processed by a computer). Reference numeral 102 denotes a memory control circuit used to read out data from the print buffer 103. Reference numeral 101 denotes an index data processing circuit for decimating and converting index data read out by the memory control circuit 102.

Reference numeral 110 denotes an index SRAM controller according to the present invention. The index SRAM controller 110 has a dedicated FIFO control circuit 111 and memory control circuit 112, and controls an internal SRAM 113.

The dedicated FIFO control circuit 111 is used to FIFO control the internal SRAM 113. The memory control circuit 112 outputs control signals such as read/write waveforms used to read/write data, i.e., to control memory I/O, to the internal SRAM 113.

An index expansion processing circuit 120 reads out data from the index SRAM controller 110. Index data read out by the index expansion processing circuit 120 are converted into real data, which are passed to an ink-jet head control circuit 130. The circuit 130 rearranges data in a practical transfer order to an ink-jet head, and executes density adjustment and the like.

The generated final print data is sent to an ink-jet head 131.

Figure 2:
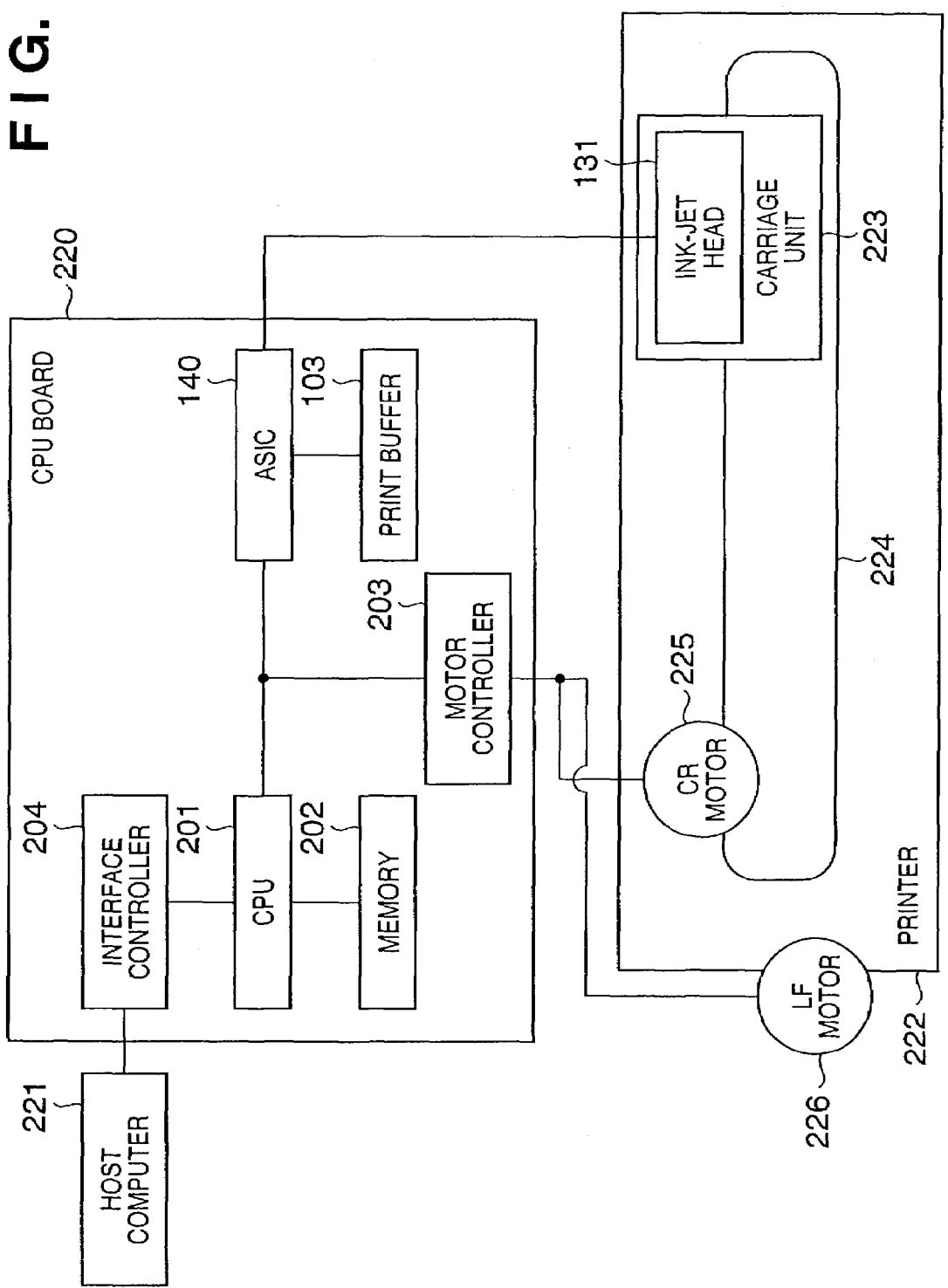
FIG. 2 is a block diagram showing the arrangement of the overall print system.

FIG. 2 is a block diagram showing the arrangement of the overall print system. Reference numeral 221 denotes a host computer which issues a print request to the printer; and 220, a CPU board of the printer. Reference numeral 204 denotes an interface controller mounted on the CPU board 220. This embodiment uses an IEEE1284 interface controller, but the present invention is not limited to such specific controller.

Reference numeral 201 denotes a CPU for controlling the overall printer; and 202, a memory used to process a program and data used by the CPU 201.

Reference numeral 203 denotes a motor controller which controls a carriage (CR) motor 225 and feed (LF) motor 226.

Reference numeral 224 denotes a belt, which is driven by the CR motor 225 to reciprocally move a carriage unit 223 attached to that belt in the main scan direction (the directions of arrows a and b in FIG. 12).

Reference numeral 140 denotes an ASIC which forms a control circuit in the printing apparatus. The print buffer 103 is used by the ASIC 140. The ink-jet head 131 is mounted on the carriage 223 and executes a print process when the carriage 223 moves reciprocally.

<Control of Print Data>

As an aspect of a print control method, it is desirable to follow the following sequence. For example, a print control method that stores data sent from an external apparatus in a memory, reads out the stored data, expands and prints the readout data as print data which matches the configuration of a printhead, comprises the determination step of determining the priority order of data write or read accesses on the basis of a write request used to write data in a memory in a FIFO format, and a read request used to read out the stored data by designating it using an address pointer; and the memory control step of controlling data write or read accesses to the memory on the basis of determination in the determination step, the determination step includes the step of updating the pointer that specifies the read address of data in accordance with the read request, and the memory control step includes the step of controlling to divisionally read out data stored in the memory in the FIFO format in accordance with the memory address specified by the pointer.

Figure 4:
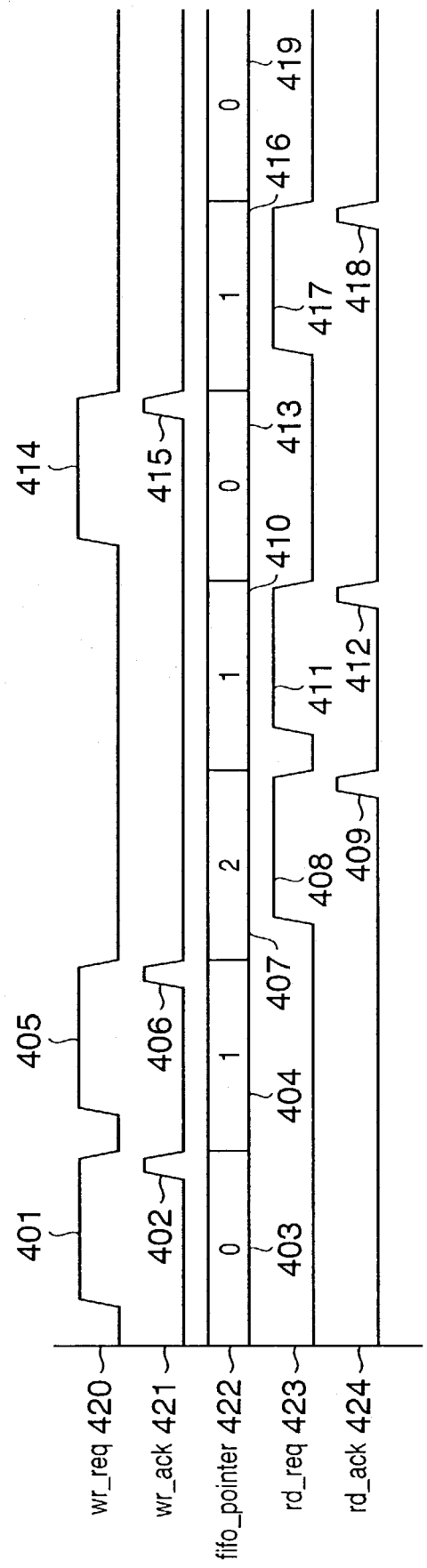
FIG. 4 is a timing chart showing the relationship among write and read accesses, and FIFO pointer values, i.e., showing FIFO control waveforms when the FIFO pointer value counts up by 1 per write access, and counts down by 1 per read access.
Figure 5:
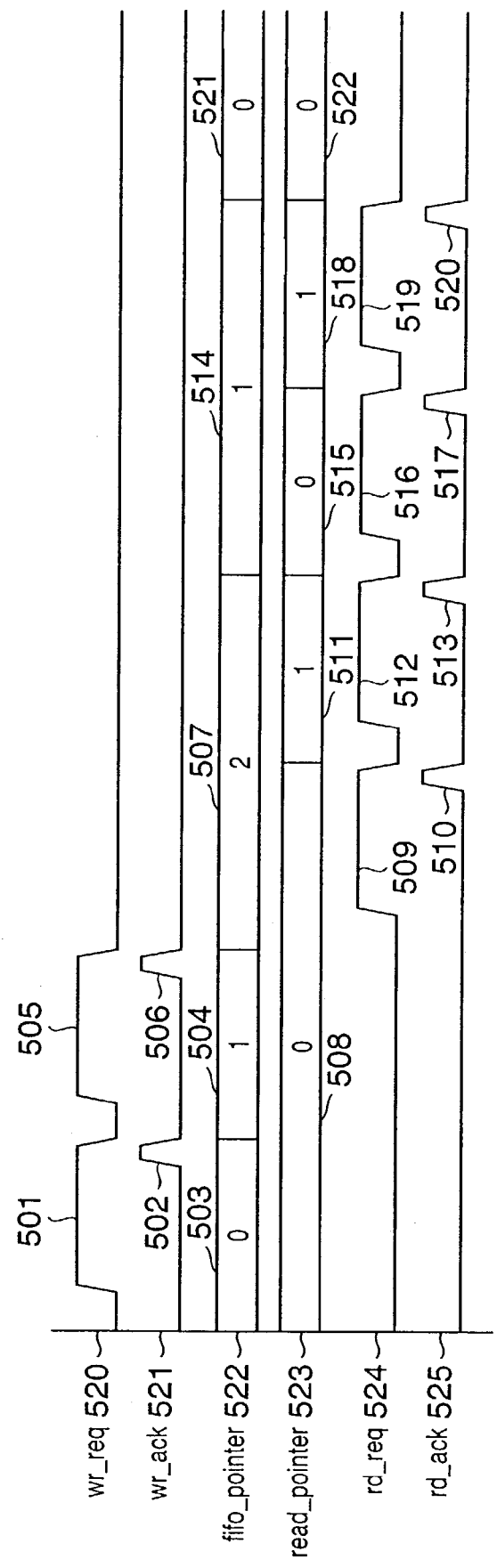
FIG. 5 is a timing chart for explaining the operation explained using FIG. 3, i.e., for explaining a process executed when the FIFO pointer value counts up by 1 per two write accesses, or counts down by 1 per two read accesses, in detail.
Figure 9:
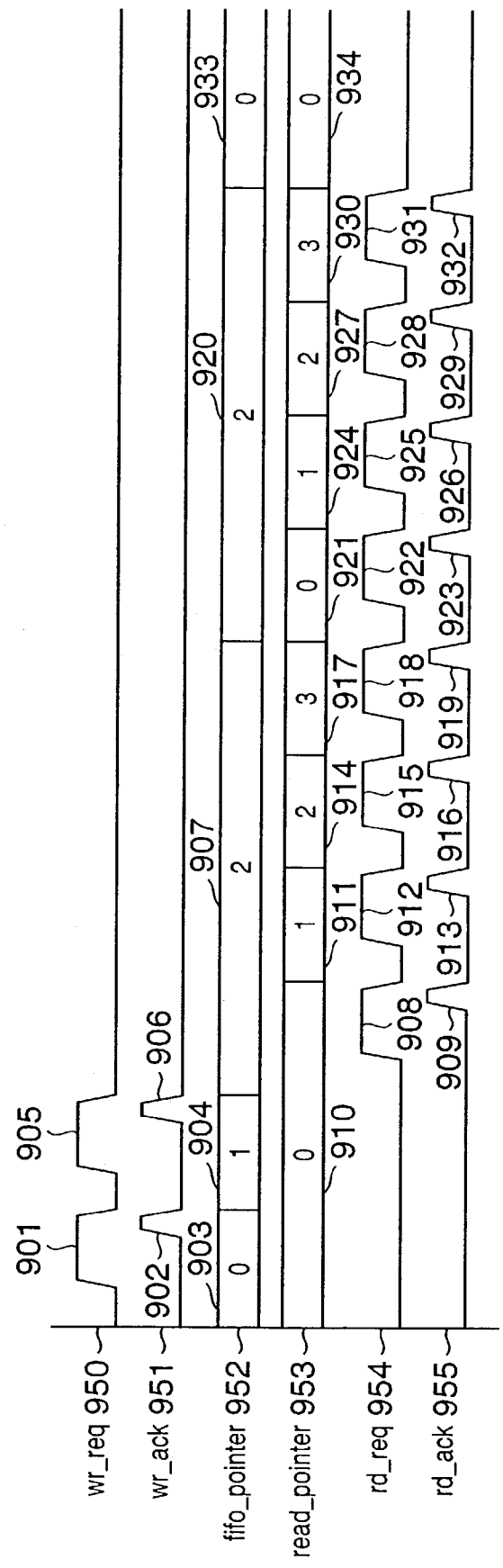
FIG. 9 is a timing chart for explaining the operation explained using FIG. 8, i.e., a view for explaining a process executed when the FIFO pointer value counts down by 1 per four read accesses, in detail.

Upon executing this sequence, data I/O is controlled in accordance with the timings charts shown in FIGS. 4, 5, and 9.

Data write and read accesses will be explained in detail below.

Figure 3:
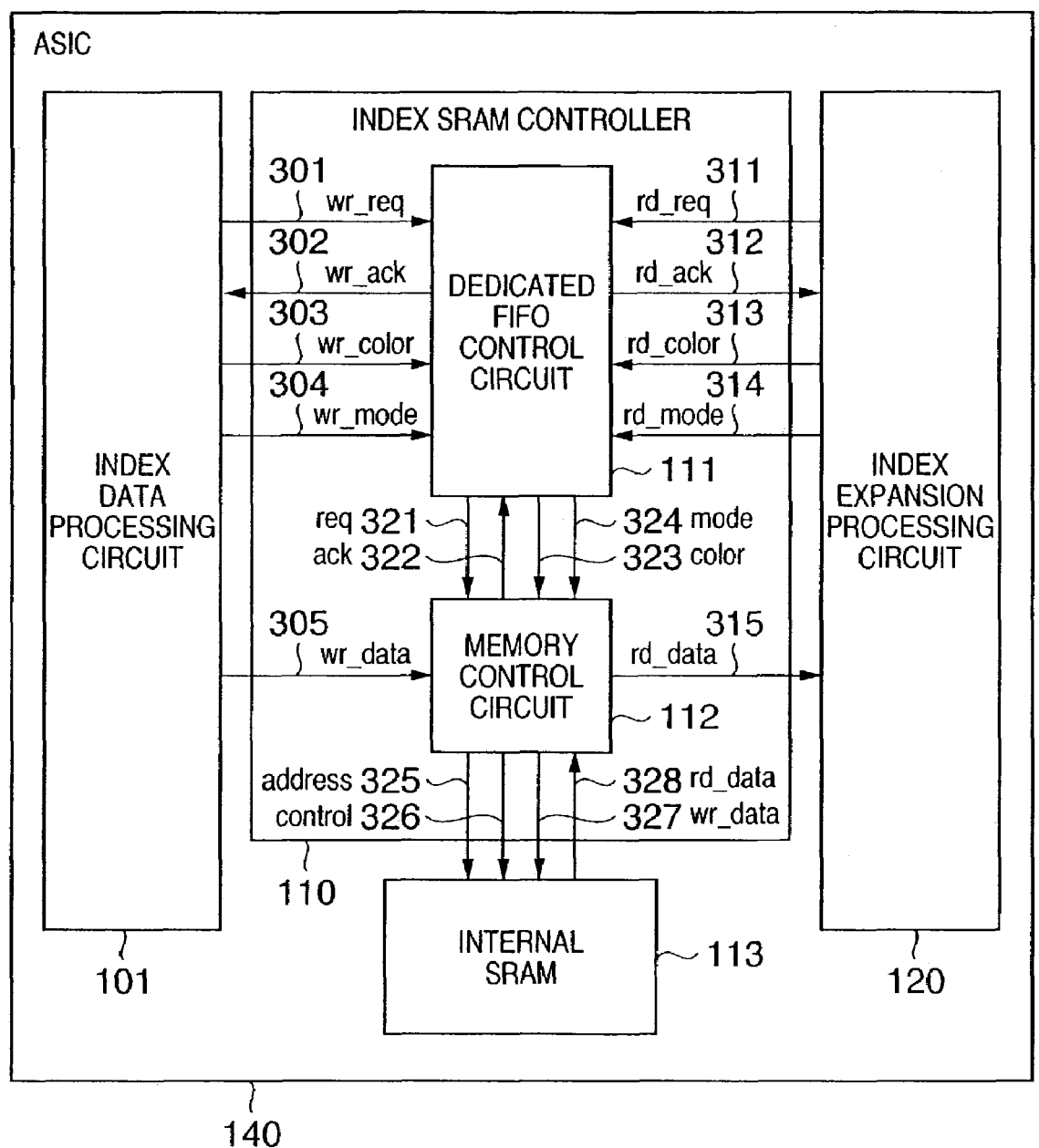
FIG. 3 is a block diagram for explaining the control of print data and the flow of data in an index SRAM controller 110.

FIG. 3 is a block diagram for explaining the control of print data and the flow of data by entering practical signal lines around the index SRAM controller 110 shown in FIG. 1.

<Write Access>

Processed data is prepared in the index data processing circuit 101. At that time, the index data processing circuit 101 asserts a write request signal (wr_req) 301 to the dedicated FIFO control circuit 111, and outputs write data (wr_data) 305 to the memory control circuit 112 at the same time. Furthermore, the index data processing circuit 101 outputs a designation signal (wr_color) 303 of color to be written, and a write mode signal that designates a data size (wr_mode) 304 to be written to the dedicated FIFO control circuit 111.

The dedicated FIFO control circuit 111 accepts the write request signal (wr_req) 301 first from the index data processing circuit 101, and outputs a request signal (req) 321 to the memory control circuit 112 on the basis of the accepted signal.

At the sake time, the dedicated FIFO control circuit 111 outputs a color designation signal (color) 323 generated based on the color designation signal (wr_color) 303, and a mode designation signal (mode) 324 generated based on the data size signal (wr_mode) 304 to the memory control circuit 112.

The memory control circuit 112 generates a waveform required to control the internal SRAM 113 on the basis of the received request signal (req) 321, color designation signal (color) 323, mode designation signal (mode) 324, and write data (wr_data) 305, and outputs, an address signal (address) 325, control signal 326 such as a read/write signal or the like and write data (wr_data) 327, to the internal SRAM 113.

Upon completion of access to the internal SRAM 113, the memory control circuit 112 outputs an ack signal (ack) 322 to the dedicated FIFO control circuit 111.

At the time of reception of the ack signal (ack) 322, the dedicated FIFO control circuit 111 outputs an ack signal (wr_ack) 302 to the index data processing circuit 101, and counts up its internal FIFO counter, corresponding to the designated color, by 1.

As a result of exchanging the aforementioned signals, write data can be controlled to be stored in the memory in accordance with the predetermined condition.

<Read Access>

The read access of data stored in the memory will be explained below.

The index expansion processing circuit 120 sends a read request signal (rd_req) 311 of the next data to be processed to the dedicated FIFO control circuit 111. Simultaneously with assertion of the read request signal (rd_req) 311, the index expansion processing circuit 120 outputs a designation signal 313 of color of data to be read, and a read mode signal 314 that designates the data size to be read and also the number of times of read of the FIFO to count down the FIFO counter, to the dedicated FIFO control circuit 111.

Upon receiving the read request signal (rd_req) 311, the dedicated FIFO control circuit 111 outputs a request signal (req) 321 to the memory control circuit 112.

The control circuit 111 generates a color designation signal (color) 323 on the basis of the color designation signal (rd_color) 313 and a mode signal (mode) 324 based on the read mode signal (rd_mode) 314, and outputs to the memory control circuit 112.

The memory control circuit 112 generates a signal waveform required to control the internal SPAM 113 on the basis of the signals (321, 323, 324) received from the dedicated FIFO control circuit 111, and sends an address signal (address) 325 used to designate the address of read data and a control signal (control) 326 used to control read access of data to the internal SRAM 113, thus reading out predetermined read data (rd_data) 328.

Upon completion of access to the internal SRAM 113, the memory control circuit 112 sends an ack signal (ack) 322 to the dedicated FIFO control circuit 111, and outputs the data read out from the internal SRAM 113 as read data (rd_data) 315 to the index expansion processing circuit 120.

At the time of reception of the ack signal (ack) 322, the dedicated FIFO control circuit 111 outputs an ack signal (rd_ack) 312 to the index expansion processing circuit 120. At the same time, the circuit 111 counts down its internal FIFO counter, corresponding to the designated color, by 1 when read accesses have been made for a number of times corresponding to the designated number of times.

FIG. 4 is a timing chart showing the relationship among the write and read accesses that have been explained using FIG. 3, and the FIFO pointer values, i.e., showing the FIFO control waveform used when the FIFO pointer value counts up by 1 per write access, and counts down by 1 per read access.

Reference numeral 420 denotes the waveform of the write request signal (wr_req); and 421, that of the write ack signal (wr_ack) to be output in response to this write request signal. Reference numeral 422 denotes a FIFO pointer value. Reference numeral 423 denotes the waveform of the read request signal (rd_req); and 424, that of the read ack signal (rd_ack) to be output upon reception of the read request signal 423.

Upon receiving a write request signal in a timing 401, a write ack signal 402 is output. At this time, a FIFO pointer value (403) counts up from "0" to "1" as a pointer value (404).

Upon receiving the next write request signal in a timing 405, a write ack signal is output at a timing 406. At this time, the FIFO pointer value (404) changes from "1" to "2" as a pointer value (407). The FIFO pointer value counts up one by one in accordance with the write signal and write ack signal.

Upon receiving a read request signal (rd_req) at a timing 408 and outputting a read ack signal (rd_ack) at a timing 409, the FIFO pointer value (407) changes from "2" to "1" as a pointer value (410).

Furthermore, upon receiving a read request signal at a timing 411 in the timing chart, a read ack signal (rd_ack) 424 is output at a timing 412, and the FIFO pointer value (410) changes from "1" to "0" as a pointer value (413).

The FIFO pointer value counts down one by one in accordance with one read request signal and read ack signal.

FIG. 5 is a timing chart for explaining the operation described using FIG. 3, i.e., a process executed when the FIFO pointer value counts up by 1 per two write accesses, or counts down by 1 per two read accesses.

Reference numeral 520 denotes the waveform of a write request signal (wr_req); and 521, the waveform of a write ack signal (wr_ack) output in response to this write request signal. Reference numeral 522 denotes a FIFO pointer value; and 523, a read pointer value.

Reference numeral 524 denotes the waveform of a read request signal (rd_req); and 525, the waveform of a read ack signal (rd_ack) output upon reception of this read request signal.

A write request signal is input at a timing 501, and a write ack signal 502 is output. At this time, the FIFO pointer value (503) changes from "0" to "1" as a pointer value (504).

The second write request signal is input at a timing 505, and a write ack signal 506 is output. At this time, the FIFO pointer value (504) changes from "1" to "2" as a pointer value (507). At this time, a read pointer value (508) remains "0".

On the other hand, when a read request is input at a timing 509, a read ack signal 510 is output. At this time, the read pointer value (508) counts up from "0" to "1" as a read pointer value (511).

When the next read request signal is input at a timing 512, a read ack signal 513 is output. At this time, the read pointer value (511) counts down from "1" to "0" as a read pointer value (515).

At the same time, the FIFO pointer value (507) counts down from "2" to "1" as a FIFO pointer value (514).

The output process of the two read request signals and the changes in FIFO pointer value and read pointer value in response to the first write request signal 501 have been explained.

Furthermore, when a read request signal 516 is input and a read ack signal 517 is output, the read pointer value (515) counts up from "0" to "1" as a read pointer value (518) at that time.

When a read request 519 is input and a read ack signal 520 is output, the read pointer value (518) counts down from "1" to "0" as a read pointer value (522) at that time.

At the same time, the FIFO pointer value (514) counts down from "1" to "0" as a FIFO pointer value (521), thus ending the process.

The output process of the two read request signals and the changes in FIFO pointer value and read pointer value in response to the second write request signal 505 have been explained.

<Expansion of Index Data>

Figure 6:
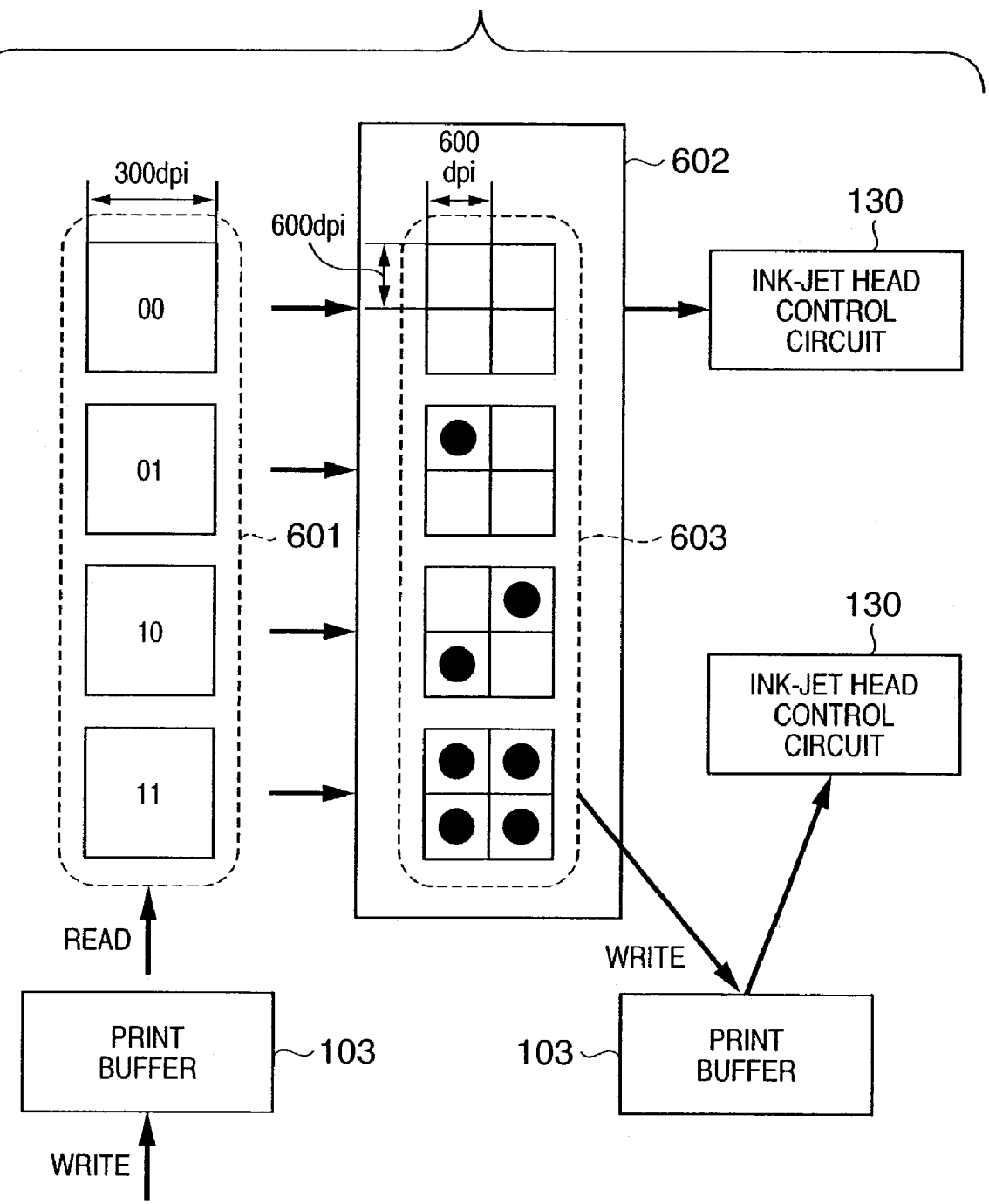
FIG. 6 is a view for explaining a expansion method of index data as related technology taken into consideration in accomplishing this invention.

Prior to a detailed description of the index data expansion process, a processing taken into consideration in making this invention will be explained. FIG. 6 is a view for explaining the processing taken into consideration index data expansion method. Referring to FIG. 6, data read out from the print buffer 103 are those for one column, which include 300-dpi, 2-bit data, as indicated by a data sequence 601. FIG. 6 exemplifies four 300-dpi, 2-bit index data "00", "01", "10", and "11". When these data are input to an index expansion circuit 602 and are expanded, one index data is expanded to a 2×2 matrix at a resolution of 600 dpi in the vertical and horizontal directions.

That is, eight dots of data for two columns at 600 dpi are generated.

In the taken into consideration method, all index-expanded values are stored in a register. In this example, 8-bit data is merely converted into 16-bit data. However, when the number of nozzles increases, a 2560-bit register is required in case of, e.g., 1280 nozzles. In a four-color printer, the register size increases fourfold to 5120 bits.

In another taken into consideration method in which index-expanded data are temporarily returned to the print buffer 103 and are read out when they are necessary, the use efficiency of the print buffer drops since extra read and write accesses to the print buffer 103. The drop in the use efficiency is a problem which should be solved.

For example, when a 32-bit memory is used to store 2560-bit data, 80 (=2560/32) memory cycles are required. When both read and write accesses are taken into consideration, processes for 160 cycles twice the 80 memory cycles are required. When a RAM that requires 100 nm per cycle is used, 16 μs are required.

Since only 40 (=1280/32) cycles are required to read out index data, memory accesses four times that process are required.

Figure 7:
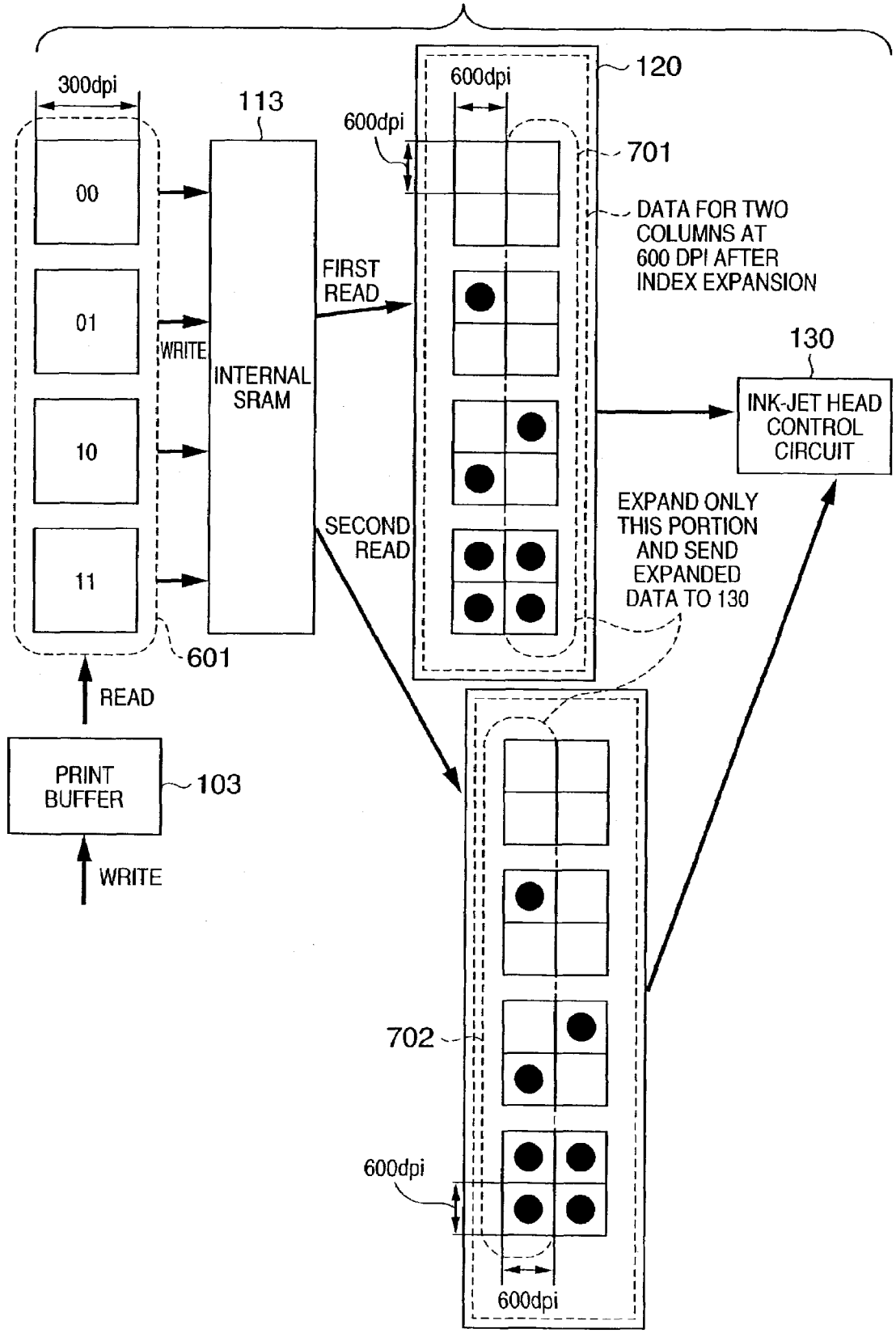
FIG. 7 is a view for explaining an expansion process method of index data in the first embodiment.

FIG. 7 is a view for explaining the index data expansion method in this embodiment. Data read out from the print buffer 103 have an index data format, i.e., a structure 601. In the structure 601, four 300-dpi, 2-bit index data "00", "01", "10", and "11", are exemplified.

These data are stored in the internal SRAM 113. When the stored data are input to and are expanded by the index expansion processing circuit 120, one index data is expanded to binary data arranged in a 2×2 matrix at a resolution of 600 dpi in the vertical and horizontal directions, and the readout index data can generate 8 dots of data for two columns at 600 dpi as a whole.

In this embodiment, since data for one column to be used of all the index-expanded values are accessed and are stored in a register, only a 1280-bit register suffices to be used in case of 1280 nozzles.

When data for the next column are required, they must be read out from the internal SRAM 113, as indicated by "second read" in FIG. 7, and must be expanded again by the index expansion processing circuit 120.

As data, data 701 for the first column, which have been expanded by the first read access, and data 702 for the second column, which have been expanded by the second read access, independently undergo expansion processes, and are sent to the ink-jet head control circuit 130.

Since the dedicated internal SRAM 113 is used, a problem of memory accesses, which is posed in the taken into consideration process, can be solved.

The internal SRAM can basically guarantee a unit access time several times faster than the print buffer which comprises a DRAM arranged outside the ASIC. In addition, even when the system requires a high speed, a measure against such high-speed requirement can be easily taken by expanding the bus width in accordance with the requirement.

In this embodiment, when the print buffer makes one write and read accesses, the internal SRAM makes one write access and two read accesses, i.e., accesses to these memories have a relationship of 2:3. In order to synchronize accesses to these memories, the access speed to the internal SRAM 113 need only be 1.5 times that to the print buffer.

Since the FIFO control is used as the peripheral control of the internal SRAM 113, the access method of the index data processing circuit 101 and index expansion processing circuit 120 can be easily controlled in terms of timings.

That is, since the FIFO control is used as the data I/O control with respect to the memory, the index data processing circuit 101 can always make read/write accesses to the internal SRAM 113, and the index expansion processing circuit 120 can read out data anytime.

Figure 10:
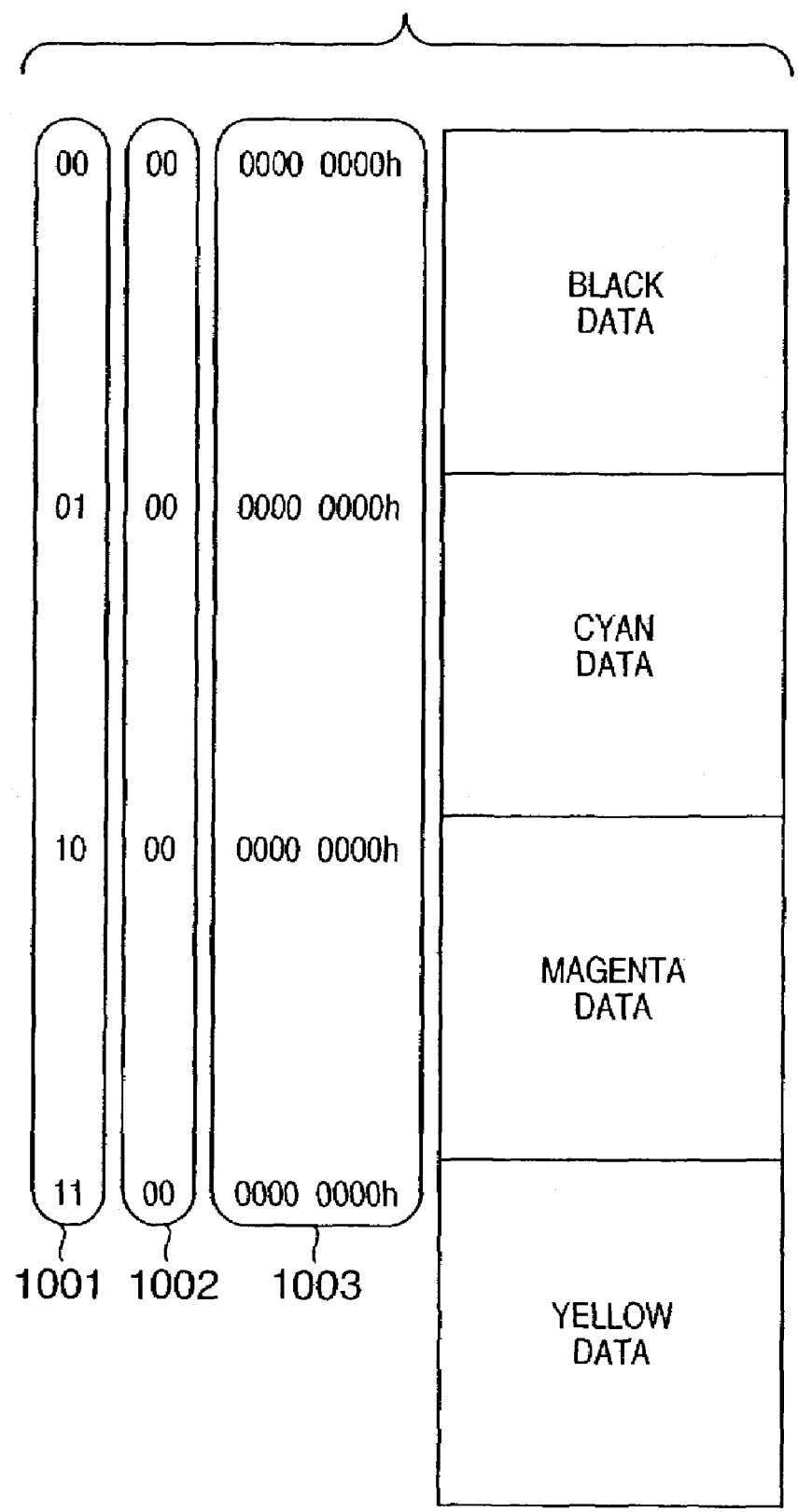
FIG. 10 shows the memory map of the internal SRAM.

FIG. 10 shows the memory map of the internal SRAM.

In this memory map, upper 2 bits 1001 of an address indicate color information (color address).

Also, 2 bits 1002 indicate a BANK address, which is switched by the FIFO control.

These address data indicate those of actual data to be exchanged between blocks in response to one request, and can cope with up to 2048 bits in an 8-bit memory.

Figure 11:
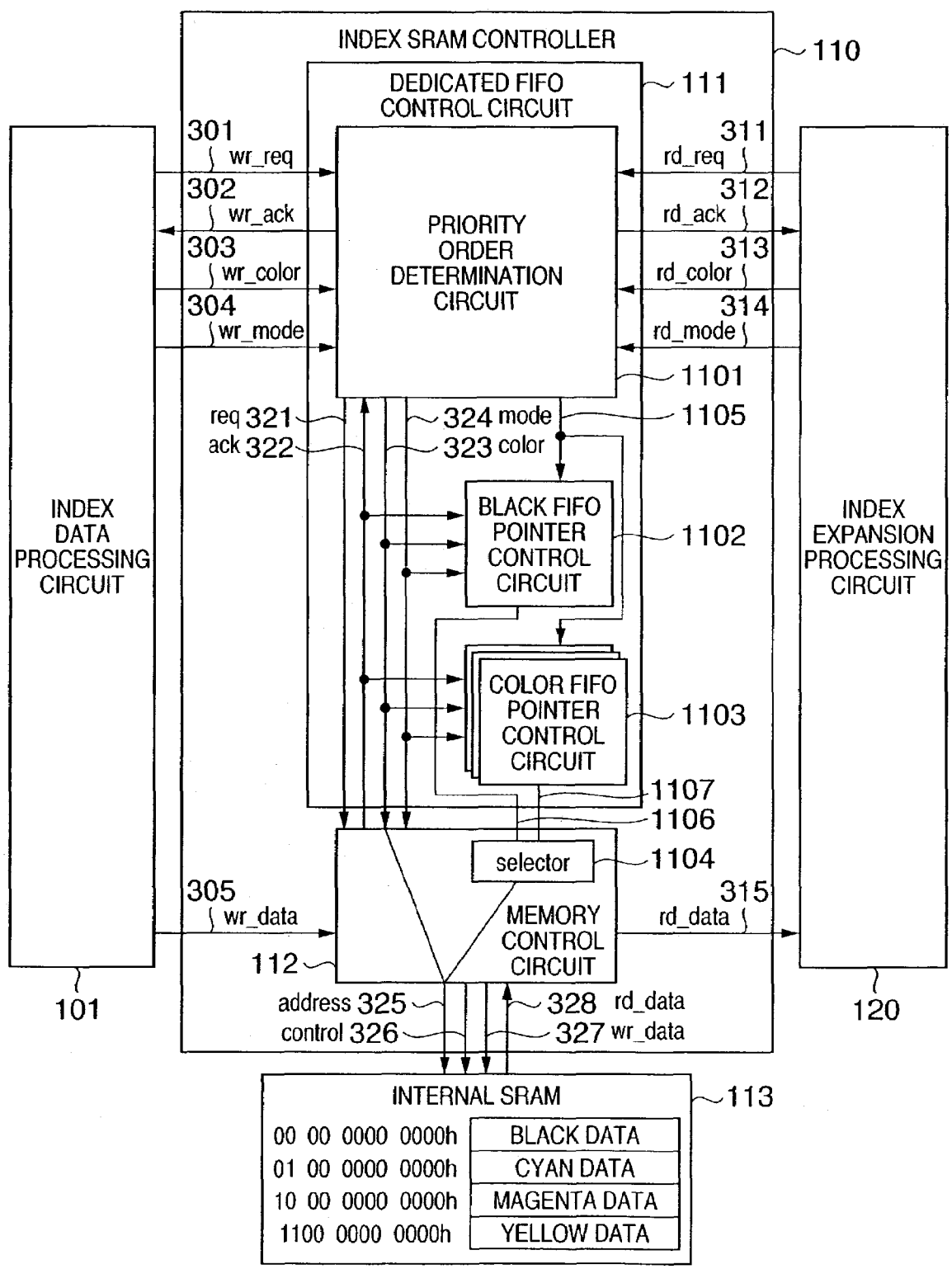
FIG. 11 is a block diagram showing the arrangement for executing control of print data.

FIG. 11 is a block diagram showing the arrangement that implements the control of print data.

The dedicated FIFO control circuit 111 includes a priority order determination circuit 1101, which determines whether to accept a write request signal (wr_req) 301 output from the index data processing circuit 101 or a read request signal (rd_req) 311 output from the index expansion processing circuit 120. The circuit 1101 outputs a determined request signal (req) 321 to the memory control circuit 112, and outputs a color and mode in the selected request to the memory control circuit 112 as a color signal (color) 323 and mode signal (mode) 324 at the same time.

In response to the received request signal 321, the memory control circuit 112 sends back an ack signal (ack) 322 to the priority order determination circuit 1101.

The FIFO control in the memory control circuit 112 is attained based on a select signal 1105 which indicates the current request signal to be accepted, the ack signal 322, the color signal 322, and the mode signal 324.

The dedicated FIFO control circuit 111 includes a black FIFO pointer control circuit 1102, and color FIFO pointer control circuits 1103. The color FIFO pointer control circuits 1103 respectively have cyan, magenta, and yellow FIFO pointers, and use common operation mode control itself.

Since independent black and color FIFO pointer control circuits are used, different black and color data structures (e.g., black data is real data and color data are 2-bit index data) can be coped with.

As a result of the FIFO control, the next bank addresses to be used are determined, and a blank bank address 1106 and color bank address 1107 are output to the memory control circuit 112.

A selector 1104 selects one of the black bank address signal 1106 and color bank address signal 1107 in accordance with the color signal 323, and outputs a bank address 325 to be used. The memory control circuit 112 controls the bank address of the memory in accordance with a predetermined request signal to access the internal SRAM, thus controlling data read and write accesses.

As described above, according to this embodiment, the internal SRAM 113 is interposed between the index data processing circuit 101 and index expansion processing circuit 120, and the FIFO pointer control circuits (1102, 1103) control read and write accesses in correspondence with the data structure to be used, e.g., make special control for updating each FIFO pointer after two read accesses, since data for two columns can be generated in case of 2-bit index data. Since the internal SRAM of the ASIC is used as an intermediate memory, high-speed memory access can be easily attained, thus improving the system throughput.

Since only one required column is processed every time the dedicated FIFO undergoes read access, the circuit scale of the index expansion processing circuit can be reduced as the number of bits of multi-valued index data increases.

Second Embodiment

Figure 8:
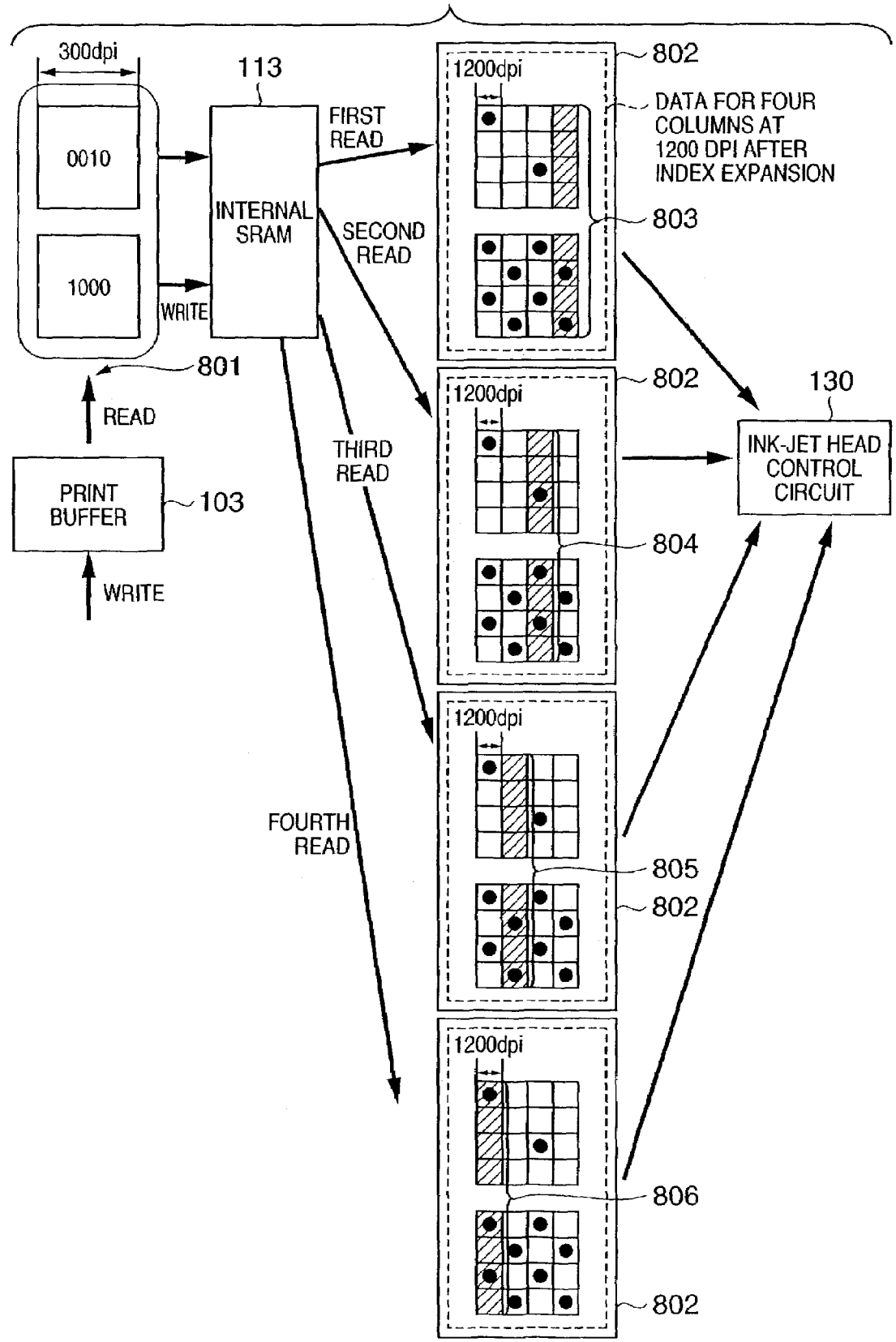
FIG. 8 is a view for explaining the second embodiment, i.e., a method of reading data from an internal SRAM 113 a plurality of times, and expanding the read data.

FIG. 8 is a view for explaining the expansion process of different index data, which is attained by extending the process for reading out data from the internal SRAM 113 in two read accesses, which has been explained using FIG. 7.

Data read out from the print buffer 103 have an index data format, i.e., a structure 801. FIG. 8 exemplifies two 300-dpi, 4-bit index data "0010" and "1000".

These data are stored in the internal SRAM 113 as in the first embodiment.

When the stored data are input to and expanded by an index expansion processing circuit 802, one index data is expanded to a 4×4 matrix at a resolution of 600 dpi in the vertical and horizontal directions. That is, 8 dots of data for four columns at 600 dpi can be generated.

In this embodiment, since data for one column to be used of all the index-expanded values are accessed and are stored in a register, only a 1280-bit register suffices to be used in case of 1280 nozzles. However, when data for the next column are required, they must be read out from the internal SRAM 113, and must be expanded again.

When the first column is used, only data for one column (hatched portions) of expanded data 803, which have been expanded by the first read access from the SRAM, are used as print data. For the second column, data for one column of expanded data 804, which have been expanded by the second read access, undergo a process as print data. Likewise, data for one column (third column) of index-expanded data 805 are used for the third column, and data for one column (fourth column) of index-expanded data 806 are used for the fourth column.

Since the dedicated internal SRAM 113 is used, a problem of memory accesses, which is posed in the conventional process, can be solved.

The internal SRAM can basically guarantee a unit access time several times faster than the print buffer which comprises a DRAM arranged outside the ASIC. In addition, even when the system requires a high speed, a measure against such high-speed requirement can be easily taken by expanding the bus width in accordance with the requirement.

In this embodiment, when the print buffer makes one write and read accesses, the internal SRAM makes one write access and four read accesses, i.e., accesses to these memories have a relationship of 2:5. In order to synchronize accesses to these memories, the access speed to the internal SRAM 113 need only be 2.5 times that to the print buffer.

Since the FIFO control is used as the peripheral control of the internal SRAM 113, the access method of the index data processing circuit 101 and index expansion processing circuit 120 can be easily controlled in terms of timings.

That is, since the FIFO control is used as the data I/O control with respect to the memory, the index data processing circuit 101 can always make read/write accesses to the internal SRAM 113, and the index expansion processing circuit 120 can read out data anytime.

FIG. 9 is a timing chart for explaining the operation that has been described using FIG. 8, i.e., a process executed when the FIFO pointer value counts down by 1 per four read accesses, in detail.

Reference numeral 950 denotes the waveform of a write request signal (wr_req); and 951, the waveform of a write ack signal (wr_ack) output in response to that write request signal. Reference numeral 952 denotes a FIFO pointer value. Reference numeral 953 denotes a read pointer value; 954, the waveform of a read request signal (rd_req); and 955, the waveform of a read ack signal (rd_ack).

When a write request signal is input at a timing 901, a write ack signal 902 is output. At this time, a FIFO pointer value (903) changes from "0" to "1" as a pointer value (904).

When the second write request signal is input at a timing 905, a write ack signal is output at a timing 906. At this time, the FIFO pointer value (904) changes from "1" to "2" as a pointer value (907).

When the two write request signals are input, the FIFO pointer value counts up one by one (i.e., from "0" to "1", and from "1" to "2"). In the second embodiment, the following four read request signals are issued with respect to one write request signal.

When a read request signal is input at a timing 908, a read ack signal is output at a timing 909. At this time, a read pointer value (910) changes from "0" to "1" as a read pointer value (911).

When the second read request signal is input at a timing 912, a read ack signal 913 is output. At this time, the read pointer value (911) changes from "1" to "2" as a pointer value (914).

Furthermore, when the third read request signal is input at a timing 915, and a read ack signal 916 is output, the read pointer value (914) changes from "2" to "3" as a pointer value (917).

When the fourth read request signal is input at a timing 918, and a read ack signal (919) is output, the read pointer value (917) changes from "3" to "0" as a read pointer value (921).

At the same time, the FIFO pointer value (907) changes from "2" to "1" as a FIFO pointer value (920).

The output of the four read request signals and the changes in FIFO pointer value and read pointer value in response to the first write request signal 901 have been explained.

Four read request signals 922, 925, 928, and 931 are output in response to the second write request signal 905. In this case as well, the read pointer value counts up one by one in response to output of one read request signal, and is reset to zero after the fourth read request signal is output. At this time, the FIFO pointer value also counts down from "1" to "0", thus ending the process.

As described above, according to this embodiment, the internal SRAM 113 is interposed between the index data processing circuit 101 and index expansion processing circuit 802, and the FIFO pointer control circuits (1102, 1103) control read and write accesses in correspondence with the data structure to be used, e.g., make control for updating each FIFO pointer after four read accesses are repeated in case of 4-bit index data. Since the internal SRAM of the ASIC is used as an intermediate memory, high-speed memory access can be easily attained, thus improving the system throughput.

Since only one required column is processed every time the dedicated FIFO undergoes read access, the circuit scale of the index expansion processing circuit can be reduced as the number of bits of multi-valued index data increases.

In the above embodiments, a liquid which is to be ejected from the printhead is described as ink, and a liquid stored in the ink tank is also described as ink. However, the liquid stored in the ink tank is not limited to ink. For example, a treatment solution or the like which is ejected to a print medium to improve the fixing property and water resistance of a printed image or to improve the image quality may be stored in the ink tank.

The above embodiment can achieve high-density, high-definition print process using a system, which comprises means (e.g., an electro-thermal conversion element, laser beam, and the like) for generating heat energy as energy utilized upon ejecting ink, and causes changes in state of ink by the heat energy, among the ink-jet print systems.

As the representative arrangement and principle of such ink-jet printing system, one practiced by use of the basic principle disclosed in, for example, U.S. Pat. Nos. 4,723,129 and 4,740,796 is preferred. The above system is applicable to either one of so-called on-demand type and continuous type. Particularly, in the case of the on-demand type, the system is effective because, by applying at least one driving signal, which corresponds to print information and gives a rapid temperature rise exceeding nucleus boiling, to each of electro-thermal conversion elements arranged in correspondence with a sheet or liquid channels holding liquid (ink), heat energy is generated by the electro-thermal conversion element to effect film boiling on the heat acting surface of the printhead, and consequently, a bubble can be formed in the liquid (ink) in one-to-one correspondence with the driving signal.

By ejecting the liquid (ink) through an ejection opening by growth and shrinkage of the bubble, at least one ink droplet is formed. If the driving signal is applied as a pulse signal, the growth and shrinkage of the bubble can be attained instantly and adequately to achieve ejection of the liquid (ink) with particularly high response characteristics.

As the pulse driving signal, signals disclosed in U.S. Pat. Nos. 4,463,359 and 4,345,262 are suitable. Note that a further excellent print process can be performed by using the conditions described in U.S. Pat. No. 4,313,124 of the invention which relates to the temperature rise rate of the heat acting surface.

As an arrangement of the printhead, in addition to the arrangement as a combination of orifices, liquid channels, and electro-thermal conversion elements (linear liquid channels or right-angled liquid channels) as disclosed in the above specifications, the arrangement using U.S. Pat. Nos. 4,558,333 and 4,459,600, which disclose an arrangement having a heat acting portion arranged in a bent region may be used.

An exchangeable chip type printhead which can be electrically connected to the printing apparatus main body or can receive ink from the printing apparatus main body upon being mounted on the printing apparatus main body, or a cartridge type printhead in which an ink tank is integrally arranged on the printhead itself, may be used.

It is preferable to add recovery means for the printhead, preliminary means, and the like to the arrangement of the printing apparatus of the present invention since printing can be further stabilized. Examples of such means include, for the printhead, capping means, cleaning means, pressurization or suction means, and preheating means using electro-thermal conversion elements, another heating element, or a combination thereof. It is also effective for stable printing to execute a preliminary ejection mode which performs ejection independently of printing.

Furthermore, as a print mode of the printing apparatus, the apparatus may have not only a print mode using a main color alone such as black or the like, but also at least one of a multi-color mode using a plurality of different colors or a full-color mode achieved by color mixing, although such modes may be attained either by using an integrated printhead or by combining a plurality of printheads.

Moreover, the printing apparatus according to the present invention may be integrally or independently arranged as an image output terminal of an information processing apparatus such as a computer or the like, and may adopt a form of a copying machine combined with a reader or the like, or a facsimile apparatus having a transmission/reception function.

Another Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes according to the processing sequences corresponding to the aforementioned timing charts (shown in FIGS. 4, 5, and 9).

As described above, according to the present invention, a memory is interposed between an index data processing circuit and index expansion processing circuit, and FIFO pointer control circuits control read and write accesses in correspondence with the data structure to be used, i.e., make control for updating each FIFO pointer to read 1 bit each in n read accesses in case of n-bit index data, thus reducing the data I/O load.

Since an internal SRAM of an ASIC is used as the memory, high-speed memory access can be easily attained, thus improving the system throughput.

Since only one required column is expanded every time a dedicated FIFO undergoes read access, the circuit scale of the index expansion processing circuit can be reduced as the number of bits of multi-valued index data increases.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which stores index data having N-bit format sent from an external device in a memory, expands the index data stored in the memory to dot data having N times the resolution of the index data, and executes a print process by scanning a carriage that carries a printhead on a print medium on the basis of the expanded dot data, wherein N is more than two, said apparatus comprising:

memory control means for controlling a write process to write the index data in the memory on the basis of a write request, and controlling N read accesses based on FIFO controlling to read out the same index data for one column from the memory on the basis of a read request;

expansion means for expanding each of the index data read out from the memory by said memory control means to the dot data for N columns, and selecting the dot data for one column;

a register for storing the expanded dot data for the selected one column; and printhead control means for transferring the dot data for one column stored in said register by said expansion means to the printhead, wherein said dot data for one column corresponds to a number of nozzles of the printhead, wherein said expansion means selects the dot data for a different one column every time the index data is read out from the memory by said memory control means, and wherein said register is reused for different columns of expanded dot data.

2. The apparatus according to claim 1, wherein the write request includes color information that specifies a color of data to be written, and said memory control means controls to write the index data in the memory for each color on the basis of the color information.

3. The apparatus according to claim 1, wherein the read request includes color information that specifies a color of data to be read out, and said FIFO memory control means determines whether data to be read out is black data or color data based on the color information, and controls the update process of a pointer of the FIFO controlling on the basis of the determination result.

4. The apparatus according to claim 1, wherein said expansion means expands one index data into an N×N matrix.

5. The apparatus according to claim 1, further comprising index data processing means for outputting the write request for the index data read out from a print buffer to said memory control means.

6. A print control method executed in a printing apparatus which stores index data having N-bit format sent from an external device in a memory, expands the index data stored in the memory to dot data having N times the resolution of the index data, and executes a print process by scanning a carriage that carries a printhead on a print medium on the basis of the expanded dot data, wherein N is more than two, said method comprising:

a memory control step of controlling a write process to write the index data in the memory on the basis of a write request, and controlling N read accesses based on FIFO controlling to read out the same index data for one column from the memory on the basis of a read request;

an expansion step of expanding each of the index data read out from the memory in said memory control step to dot data for N columns, and selecting the dot data for one column;

a storing step of storing expanded dot data for the selected one column in a register; and a printhead control step of transferring the dot data for one column stored in the register in said expansion step to the printhead, wherein said dot data for one column corresponds to a number of nozzles of the printhead, wherein said expansion step selects the data for a different one column every time the index data is read out from the memory in said memory control step, and wherein said register is reused for different columns of expanded dot data.

* * * * *